United States Patent
Chin et al.

(10) Patent No.: US 9,975,081 B2
(45) Date of Patent: May 22, 2018

(54) METHOD FOR PURIFYING GAS USING LIQUID MARBLES

(71) Applicant: Agency for Science, Technology and Research, Singapore (SG)

(72) Inventors: Jia Min Chin, Singapore (SG); Siok Wei Tay, Singapore (SG); Jian Wei Xu, Singapore (SG); Angeline Yan Xuan Tan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 38 days.

(21) Appl. No.: 14/893,150

(22) PCT Filed: May 23, 2014

(86) PCT No.: PCT/SG2014/000222
§ 371 (c)(1),
(2) Date: Nov. 23, 2015

(87) PCT Pub. No.: WO2014/189470
PCT Pub. Date: Nov. 27, 2014

(65) Prior Publication Data
US 2016/0114285 A1     Apr. 28, 2016

(30) Foreign Application Priority Data

May 23, 2013    (SG) ................. 201304031-6

(51) Int. Cl.
*B01D 53/14*    (2006.01)
*B01D 53/28*    (2006.01)
(Continued)

(52) U.S. Cl.
CPC ......... *B01D 53/1493* (2013.01); *B01D 53/28* (2013.01); *B01D 53/62* (2013.01);
(Continued)

(58) Field of Classification Search
None
See application file for complete search history.

(56) References Cited

U.S. PATENT DOCUMENTS

2007/0084344 A1    4/2007  Moriya et al.
2008/0276804 A1*  11/2008  Sayari ............... B01D 53/02
                                                      95/285
2010/0154636 A1    6/2010  Liu et al.

FOREIGN PATENT DOCUMENTS

CA        2755903 A1      9/2010
KR    20130047256 A       5/2013
(Continued)

OTHER PUBLICATIONS

Sakpal et al., "Carbon dioxide capture using amine functionalized silica gel." Indian J. of Chem., vol. 51A, Sep.-Oct. 2012, pp. 1214-1222.*

(Continued)

*Primary Examiner* — Daniel Berns
(74) *Attorney, Agent, or Firm* — Winstead, P.C.

(57) ABSTRACT

The invention relates to methods for purifying gas, and in particular, to such methods using liquid marbles. The liquid in the liquid marbles is comprised of a material or mixture of materials that selectively removes unwanted gaseous component in the gas to be purified.

11 Claims, 9 Drawing Sheets

(51) Int. Cl.
  *B01D 53/48* (2006.01)
  *B01D 53/52* (2006.01)
  *B01D 53/62* (2006.01)
  *B01J 13/02* (2006.01)
  *C10L 3/10* (2006.01)

(52) U.S. Cl.
  CPC ............... *B01J 13/02* (2013.01); *C10L 3/102* (2013.01); *C10L 3/106* (2013.01); *B01D 2252/2023* (2013.01); *B01D 2252/20447* (2013.01); *B01D 2252/20478* (2013.01); *B01D 2252/20484* (2013.01); *B01D 2252/20489* (2013.01); *B01D 2252/30* (2013.01); *B01D 2252/504* (2013.01); *B01D 2257/304* (2013.01); *B01D 2257/50* (2013.01); *B01D 2257/80* (2013.01)

(56) References Cited

FOREIGN PATENT DOCUMENTS

WO  2008021700 A1  2/2008
WO  2011120138 A1  10/2011

OTHER PUBLICATIONS

Goff et al., "Monethanolamine Degradation: O2 Mass Transfer Effects Under CO2 Capture Conditions," Ind. Eng. Chem. Res., vol. 43, 2004, pp. 6400-6408.

Curnow et al., "Regeneration of Carbon Dioxide Saturated Monoethanolamine-Glycol Aqueous Solutions at Atmospheric Pressure in a Packed Bubble Reactor," Ind. Eng. Chem. Res., vol. 44, 2005, pp. 1085-1089.

Written Opinion of the International Searching Authority for International Application No. PCT/SG2014/000222 dated Sep. 17, 2014, pp. 1-5.

International Preliminary Report on Patentability for International Application No. PCT/SG2014/000222 dated Nov. 24, 2015, pp. 1-7.

* cited by examiner

METHOD FOR PURIFYING GAS USING LIQUID MARBLES

CROSS-REFERENCE TO RELATED APPLICATION

This application claims the benefit of priority of Singapore Patent Application No. 201304031-6, filed May 23, 2013, the contents of which being hereby incorporated by reference in its entirety for all purposes.

TECHNICAL FIELD

The invention relates to methods for purifying gas, and in particular, to such methods using liquid marbles. The liquid in the liquid marbles is comprised of a material or mixture of materials that selectively removes unwanted gaseous component in the gas to be purified.

BACKGROUND

Natural gas, which is used by household consumers, is composed primarily of methane. Prior to use, it must be filtered, stripped of crude oil and other higher boiling alkanes (e.g. ethane, propane, or pentane), dehydrated, and "sweetened", whereby $CO_2$ and $H_2S$ are removed from the natural gas. Amongst these purification steps, both 1) the dehydration step and 2) the "sweetening" step could benefit significantly from using purification agents with increased surface area.

In the dehydration step, the gas is treated with ethylene glycols (mono-, di-, tri-, etc.) to remove water. Due to the high affinity of glycols for water, the wet gas that flows through a 'contactor', which is in essence a tower packed with mesh or bubble cap trays that maximize contact between the glycol (dessicant) and the gas, is dried through its interaction with the glycols.

The removal of acid gases from raw natural gas is referred to as "gas sweetening". Raw natural gas typically contains far higher levels of $CO_2$ and $H_2S$ than are allowed in the final product. The corrosive nature of the acidic gases and the toxicity of $H_2S$ are amongst the principle reasons for minimization of their contamination in natural gases. During the gas "sweetening" step, where $H_2S$ and $CO_2$ are removed, the gas flows through an amine-containing contactor or through a column of agitated amine solution. The amine absorbs and reacts with $H_2S$ and $CO_2$, thus removing the acidic gases from the gas mixture.

In both steps, the contact of the purifying liquids with crude or unpurified natural gas is important. By enhancing the contact area of the liquids with the gas, the efficiency and rate of purification would increase. Further, the domain size of the liquids is decreased by discretizing the liquids into micronized droplets, thus enhancing mass transport of gases (in particular gases to be absorbed) into the sorbent. This would allow the usage of shorter purification columns/ contactors and higher gas flow rates. Also, energy could be saved because there would be a decreased need for agitation of viscous liquids like diethanolamine (DEA) or monoethanolamine (MEA), which are widely used in gas sweetening processes.

In industrial gas purification set-ups, neat MEA is rarely used. Most commonly, a 20-30 wt % aqueous solution of MEA is utilized instead. This is due to the high viscosity of neat MEA (approximately 24 times that of water at 20° C.) as well as its corrosive nature. High liquid viscosity results in difficulty of liquid agitation and transport through the gas contactors. Neat DEA and triethanolamine (TEA) have even higher viscosity than that of MEA, and their agitation for enhanced surface interaction with the gases demands even more energy.

SUMMARY

It is herein disclosed that dry liquids, or otherwise known as micronized droplets of liquids, are used in gas purification steps, in particular, but not limited to, gas sweetening and dehydration of raw natural gases, and also the purification of flue or waste gases.

In various embodiments, use of dry monoethanolamine (neat), dry 30% monoethanolamine solution and dry diethanolamine (neat) for the absorption of $CO_2$ and their re-usability has been demonstrated. The high surface area of such materials greatly accelerates their reaction with $CO_2$ and also their regeneration for recycling purposes.

Accordingly, in one aspect, there is disclosed a method for purifying gas. The method includes exposing the gas to be purified to at least one type of liquid marble. The liquid marble may be comprised of a plurality of particles and/or mixture of a plurality of particles encapsulating at least one type of liquid therein. The plurality of particles may comprise nanoparticles, sub-micron particles, or microparticles. The liquid may also be comprised of a gelling agent, such as but not limited to, fumed silica or hydrophobic silica, so as to increase the stability of the dry form.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural and chemical changes may be made without departing from the scope of the invention. The various embodiments are not necessarily mutually exclusive, as some embodiments can be combined with one or more other embodiments to form new embodiments.

It is well known to persons skilled in the art that dry water (or powderized water) essentially refers to micronized droplets of water encapsulated by hydrophobic particles. Dry water is of wide interest to the industrial community, for example, for the use of cosmetic compositions and also as dry paints.

On a similar note, the term "dry oil" as used herein refers to micronized liquid marbles of oil-based liquids.

On a similar note, the term "dry gel" as used herein refers to micronized liquid marbles whereby a gelling agent is included in the encapsulated material within the liquid marble. The gelling agent may be, but not limited to, fumed silica or hydrophobic silica so as to increase the stability of the dry form of the gel.

Accordingly, besides water, alternative liquids with high surface tensions could also form micronized droplets encapsulated by particles which are relatively phobic towards the liquid of choice. By doing so, the effective surface area of the liquid is increased because the encapsulating shell is very highly porous. Further, the domain size of the liquid is decreased by converting the liquid from bulk liquid into discrete liquid droplets, hence enhancing mass transport of gases into the liquid.

Figure 1:
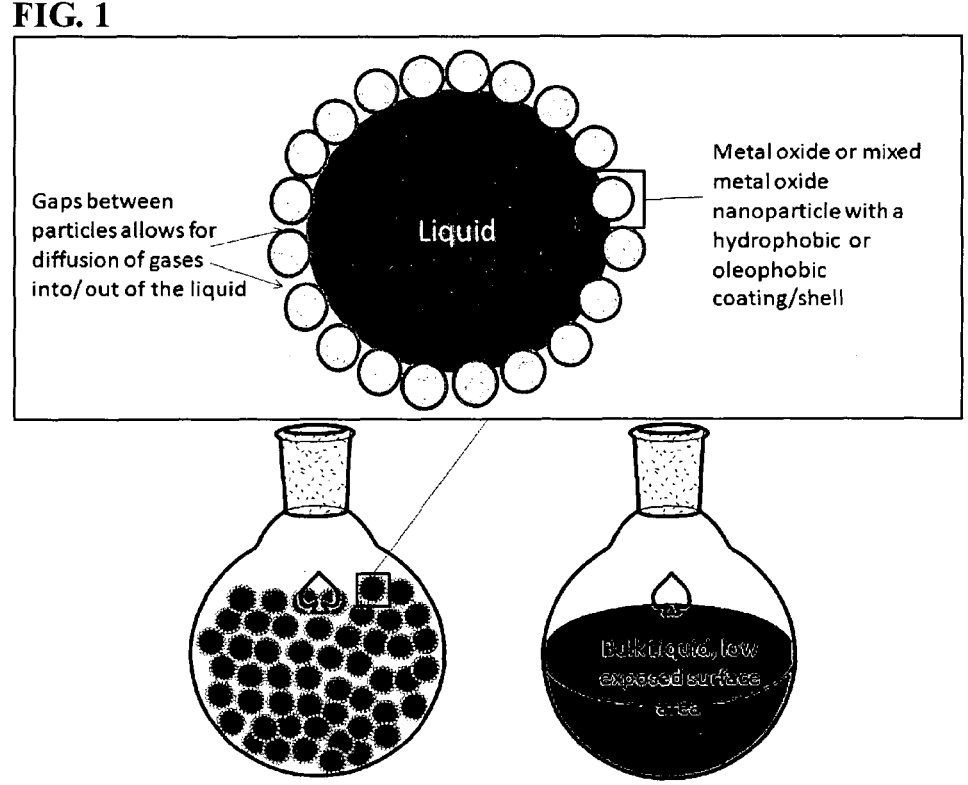
FIG. 1 illustrates a liquid droplet encapsulated by particles of low surface energy.

FIG. 1 illustrates a liquid droplet encapsulated by particles of low surface energy. Since the particles form a highly porous shell on the surface of the liquid, there is very rapid diffusion of gases into and out of the liquid through the particle gaps. Also, since this is a dynamic system, the particles are free to move over the surface of the droplet.

Based on the above phenomenon, present inventors have surprisingly identified a use for such micronized liquid droplets encapsulated by porous particulate shells for the enhancement of gas absorption. For example, by enhancing gas absorption and exchange rates, heterogeneous reactions where one of the reagents is in the gas phase would be accelerated significantly.

Accordingly, in a first aspect of the disclosure, there is disclosed a method for purifying gas. The method includes exposing the gas to be purified to at least one type of liquid marble, for example, micronized liquid marbles. The liquid marble may be comprised of a plurality of particles and/or mixture of a plurality of particles encapsulating at least one type of liquid therein. The plurality of particles may comprise nanoparticles, sub-micron particles, or microparticles. The liquid may also be comprised of a gelling agent, such as but not limited to, fumed silica or hydrophobic silica so as to increase the stability of the dry form.

In present context, the gas to be purified is comprised of a mixture of gaseous components. For example, the gas may comprise a bulk gas and at least one unwanted gaseous component. By "purified" is meant that one or more of the unwanted (i.e. undesirable) gaseous components is removed, such as, but not limited to, absorption, from the bulk gas by the liquid marble. It is to be understood that the purifying step may remove a substantial portion of the unwanted gaseous component from the bulk gas and may not necessarily be 100% removal. In other words, the gas is said to be purified when the amount of unwanted gaseous component remaining in the bulk gas is reduced to a predetermined acceptable level. In various embodiments, the bulk gas may be natural gas (unprocessed) or flue (waste) gas. In various embodiments, the unwanted gaseous components may include carbon dioxide, carbon monoxide, hydrogen sulfide, sulfur-containing gas, water vapour, or any malodorous gas and toxic gas.

As will be appreciated, the type of liquid to be comprised in the liquid marble will depend on the type of unwanted gaseous component to be removed from the gas, and therefore the choice of the liquid (or mixture of liquids) will be apparent to persons skilled in the art.

Accordingly, in various embodiments, the liquid may be selected from the group consisting of ionic liquid, alkanolamine, molecule containing amine functionality, desiccant, glycol, a solution thereof, amine-containing oligomers or polymers, and a mixture thereof. For example, if carbon dioxide or hydrogen sulfide is to be removed from a gas, then the liquid may include an amine, such as an alkanolamine. The alkanolamine may be, but not limited to, monoethanolamine (MEA), diethanolamine (DEA), triethanolamine (TEA), methyldiethanolamine (MDEA), 2-amino-2-methyl-1-propanol (AMP). The liquid may be neat (i.e. without other components), a solution thereof, or a mixture thereof. For example, the liquid may be neat MEA or an aqueous solution of MEA (such as 30%) and the resultant liquid marble may be termed dry neat MEA or dry 30% aqueous MEA, respectively. In yet further examples, the at least one type of liquid comprises a mixture of at least one alkanolamine and at least one further amine. The at least one alkanolamine may comprise MEA, DEA, or AMP and the at least one further amine may comprise, but not limited to, piperazine. In one example, the at least one type of liquid may be a mixture of DEA with piperazine.

In various embodiments, more than one type of liquid marble may be used to simultaneously remove more than one unwanted gaseous components from the gas. Accordingly, different types of nanoparticles, sub-micron particles or microparticles and/or mixture of a plurality of such particles may be used to encapsulate the liquids.

In various embodiments, the particles may hydrophobic, oleophobic, and/or omniphobic, depending on the nature of the liquid to be encapsulated. As apparent to persons skilled in the art, liquid marbles are formed through the encapsulation of micronized liquid droplets using liquid repelling particles having low surface energy. Accordingly, when a hydrophilic liquid is to be encapsulated, hydrophobic particles are used to form the shell surrounding the liquid core. For example, liquids (solutions, mixtures or neat liquids) with surface tensions of >30 mN/m (in air, at 25° C.) are preferred, though not necessarily so.

Through homogenizing or rapid mixing of the hydrophobic/oleophobic particles with the liquid of choice, a dry liquid may be formed with the liquid comprising 10-90% by weight. As discussed above, the liquid may exist as solution of various amines, acids, reagents, or may be a neat liquid in itself or a mixture of various liquids, with the final liquid having a surface tension of >30 mN/m (in air, 25° C.).

The reason behind the increased rate of unwanted gaseous component removal may be due in part to the increased surface area of the liquid comprised in the liquid marble which is exposed to the gas to be purified. In embodiments where fluorinated particles are employed to form the liquid marbles, then another reason may be due to the fluorinated alkyl chains on the surfaces of the particles. Since fluorinated groups have been shown to enhance, for example, $CO_2$ solubility, the fluorinated particles may play a role in enhancing $CO_2$ uptake.

In various embodiments, the particles may include or consist of a material selected from the group consisting of a metal, a metal oxide, an organic compound, a polymer, a composite and a mixture thereof.

In certain embodiments, the particles may be surface-treated to afford the desirable surface energies.

For example, the plurality of particles may include titanium dioxide ($TiO_2$), aluminium oxide ($Al_2O_3$), zinc oxide (ZnO), or cerium oxide ($CeO_2$).

In various embodiments where the plurality of particles is metal, a metal oxide, an organic compound, a polymer, a composite and a mixture thereof. The plurality of particles may be grafted with hydrophobic and/or oleophobic groups or molecules. The hydrophobic and/or oleophobic groups or molecules may be a silane, a silicone-based polymer, a fatty acid or a derivative thereof, an alkyl amine, an acyl chloride, and/or a mixture thereof.

For example, in the case of hydrophobicization of $TiO_2$, $Al_2O_3$, ZnO and $CeO_2$ particles, the particles may be reacted with a carboxylic acid, RCOOH, where R is a hydrophobic group such as fluorinated or non-fluorinated hydrocarbon chain. The particles may also be hydrophobicized through silanization with a silane reagent containing an alkyl, a fluoroalkyl or any other hydrophobic group.

The term "alkyl", alone or in combination, refers to a fully saturated aliphatic hydrocarbon. In certain embodiments, alkyls are optionally substituted. In certain embodiments, an alkyl comprises 1 to 18 carbon atoms, for example 6 to 18 carbon atoms, wherein (whenever it appears herein in any of the definitions given below) a numerical range, such as "1 to 18" or "$C_1$-$C_{18}$", refers to each integer in the given range, e.g. "$C_1$-$C_{18}$ alkyl" means that an alkyl group comprising only 1 carbon atom, 2 carbon atoms, 3 carbon atoms, etc., up to and including 18 carbon atoms. Examples of alkyl groups include, but are not limited to, methyl, ethyl, n-propyl, isopropyl, n-butyl, isobutyl, sec-butyl, tert-butyl, tert-amyl, pentyl, hexyl, heptyl, octyl and the like.

According to certain embodiments, the particles may be grafted with hydrophobic molecules including a silane of formula $R_mSi(OR')_{4-m}$, where m is an integer from 1 to 4, R is a $C_6$-$C_{18}$ alkyl and R' is a $C_1$-$C_{10}$ alkyl. For example, where m is 1, R in $RSi(OR')_3$ may be dodecyl, hexadecyl, or octadecyl and R' in $RSi(OR')_3$ may be methyl, ethyl, or propyl.

In alternative embodiments, the particles may be grafted with hydrophobic molecules including a silane of formula $RSiX_3$, $R_2SiX_2$, or $R_3SiX$. R is a $C_1$-$C_{18}$ alkyl and X is a halogen. For example, R in $RSiX_3$, $R_2SiX_2$, or $R_3SiX$ may be methyl, dodecyl, hexadecyl, or octadecyl.

In certain embodiments, the particles may be grafted with oleophobic molecules including a fluorinated or a perfluorinated silane of formula $R_mSi(OR')_{4-m}$ or $R_mSiX_{4-m}$, where m is an integer from 1 to 4. R is a fluorinated or a perfluorinated $C_6$-$C_{18}$ alkyl, R' is a $C_1$-$C_{10}$ alkyl, and X is a halogen. For example, where m is 1, R in $RSi(OR')_3$ may be $CF_3(CF_2)_nCH_2CH_2$—, where n is 3-15.

In other embodiments, the particles may be grafted with oleophobic molecules including a fluorinated or a perfluorinated fatty acid of formula RCOOH. R is a fluorinated or a perfluorinated $C_6$-$C_{18}$ alkyl. For example, R in RCOOH may be $CF_3(CF_2)_nCH_2CH_2$—, where n is 3-15.

In yet further embodiments, the particles may be grafted with oleophobic molecules including a fluorinated or a perfluorinated fatty acid chloride of formula RCOCl. R is a fluorinated or a perfluorinated $C_6$-$C_{18}$ alkyl. For example, R in RCOCl may be $CF_3(CF_2)_nCH_2CH_2$—, where n is 3-15.

The hydrophobic particles may be hydrophobicized silica, perfluorocarbon functionalized silica, $TiO_2$, ZnO, $Al_2O_3$, or any metal/mixed metal oxides, organic compound, a polymer, a composite and/or a mixture of the above.

In summary, by utilizing the large surface area of "dry liquids", the treatment of gases may be accelerated or enhanced without the need for agitation of the liquid after the initial formation of the 'dry liquid". As can be seen in the below-described examples, absorption of $CO_2$ within the first minute is enhanced several-fold when dry MEA solution versus bulk solution is used. As the scale of the reaction increases, the benefits of utilizing "dry MEA" and "dry MEA solutions" over bulk liquids will increase accordingly due to the decreasing feasible surface area to volume ratio of bulk liquids as the volume increases. Similarly, the regeneration of MEA should be accelerated when it is in the dry form versus bulk form.

Further, encapsulating typically highly viscous liquids by liquid-repelling (hygrophobic) particles could lead to significant energy cost savings. As an example, neat MEA may be utilized instead of 30% aqueous MEA in the absorption of $CO_2$ gas. This diminishes the amount of material to be heated for regeneration and also the volume and mass of liquid to be transported and pumped through gas purifiers. As such, their formulation as "dry DEA" or "dry TEA" could have even more energy savings in the application of acidic gas removal process.

While the below-described examples refers to the absorption of $CO_2$, the use of "dry liquids" is not limited to the absorption of $CO_2$, but also may be used for the absorption of various types of gases. One further example is the absorption of water vapor in wet raw natural gases. In such gas dehydration process, the liquid may be comprised of desiccants such as glycols or other alcohols.

In order that the invention may be readily understood and put into practical effect, particular embodiments will now be described by way of the following non-limiting examples.

EXAMPLES

Materials $TiO_2$ nanoparticles were obtained from Degussa as P25 $TiO_2$, as a mixture of rutile and anatase nanoparticles. Hydrophobic $SiO_2$ nanoparticles were obtained from SkySpring. Fumed silica particles were obtained from Aldrich (380 $m^2/g$, Catalog no. 38126-8) and used as received. Monoethanolamine (98%, Aldrich) and diethanolamine (>98.5%, Aldrich) were used as received.

Method for Lowering Surface Energy of $TiO_2$, ZnO and $CeO_2$ Particles

A method for lowering surface energy of $TiO_2$, ZnO and $CeO_2$ particles is disclosed, whereby the particles are reacted with, for example, $R_mSi(OR')_{4-m}$ or $R_mSiX_{4-m}$, where R is a hydrophobic group such as a hydrocarbon or fluorinated carbon chain including, but not limited to methyl, octadecyl, stearyl, or perfluorooctadecyl groups, as defined above.

In one example, the reaction of $TiO_2$ with perfluorooctanoyltriethoxysilane occurs as follows. $TiO_2$ nanopowder (Degussa, P25, 0.5 g) was placed in an autoclavable glass bottle with 10 mL of EtOH and sonicated for 45 minutes to fully disperse. 5 mL of EtOH was measured and adjusted to pH 11 by addition of aqueous $NH_3$ with stirring to ensure solution homogeneity. 0.15 mL of perfluorooctyltriethoxysilane was added to the basic EtOH and stirred rapidly at room temperature for 1 hour. Subsequently, this solution was poured into the $TiO_2$ dispersion and rapidly stirred at room temperature (RT) in the dark for approximately 22 hours. The powder was centrifuged to collect and washed twice with EtOH, then subsequently dried. Yield: 0.51 g.

Figure 2A:
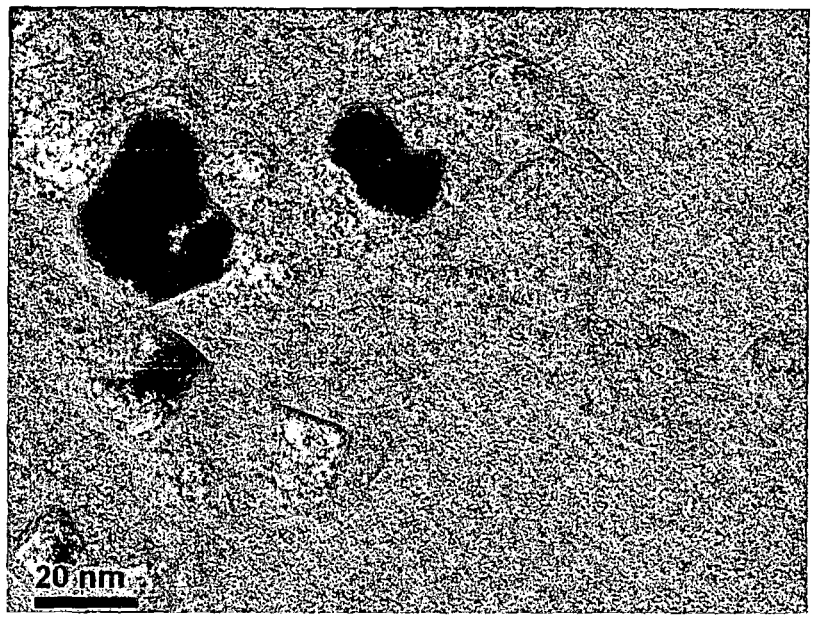
FIG. 2A shows a TEM image of perfluorooctytriethoxysilane treated $TiO_2$ particles. The small crystallites studding the larger crystals are siloxide crystallites.

FIG. 2A shows a TEM image of perfluorooctyltriethoxysilane treated $TiO_2$ particles. The small crystallites studding the larger crystals are siloxide crystallites.

Figure 2B:
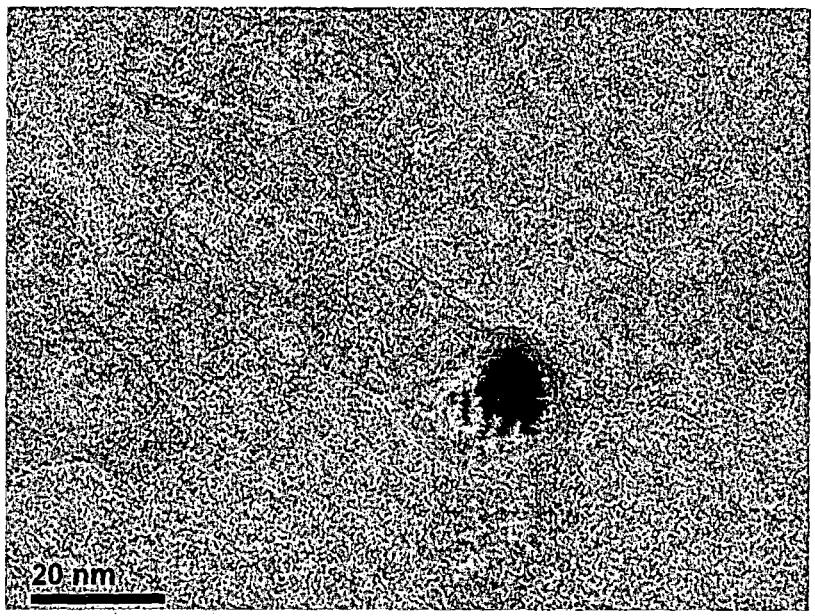
FIG. 2B shows a TEM image of perfluorooctyltriethoxysilane treated $TiO_2$ particles with PVP pre-treatment. A core-shell type structure is more prevalent in this case.

FIG. 2B shows a TEM image of perfluorooctyltriethoxysilane treated $TiO_2$ particles with PVP pre-treatment. A core-shell type structure is more prevalent in this case.

In another example, the reaction of $SiO_2$ with 1H, 1H, 2H, 2H-perfluorooctyltriethoxysilane occurs as follows. Fumed $SiO_2$ (Aldrich, 380 $m^2/g$, 10.0 g) was placed in an autoclavable 1 L glass bottle with 800 mL of EtOH and 40 ml of 28% $NH_3$ in MeOH. The mixture was sonicated for 30 minutes to fully disperse the $SiO_2$ powder. 1H, 1H, 2H, 2H-perfluorooctyltriethoxysilane (Aldrich, 4 mL) was added to the mixture and the bottle was sealed and sonicated for another 10 minutes. Subsequently, the mixture was stirred for 16 hours at RT, then dried at 100° C. over another 16 hours. The resulting white powder was placed in a centrifuge tube, weighed and stored. Yield: 11.2092 g.

In yet another example, the reaction of $SiO_2$ with 1H, 1H, 2H, 2H-perfluorooctyltriethoxysilane occurs as follows. Fumed $SiO_2$ (Aldrich, 380 $m^2/g$, 3.5 g) was placed in an autoclavable 100 mL glass bottle with 80 mL of EtOH. The mixture was homogenized for 5 minutes at 5000 rpm to disperse the $SiO_2$ and to break up aggregates. 4 ml of 28% $NH_3$ in $H_2O$ was subsequently added and the mixture stirred vigorously. 1H, 1H, 2H, 2H-perfluorooctyltriethoxysilane (Aldrich, 0.875 mL) was added to the mixture and the bottle was sealed and was stirred for 16 hours at RT, then dried at 100° C. over another 16 hours. The resulting white powder was tested for its ability to form dry DEA, and this was found to be positive.

Figure 3:
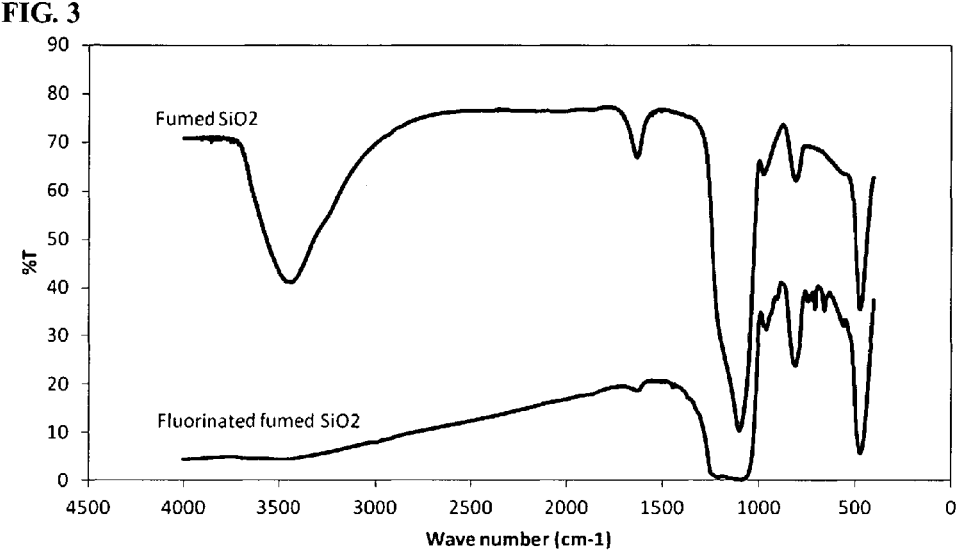
FIG. 3 shows an infrared spectrum of fumed $SiO_2$ particles and fluorinated fumed $SiO_2$ particles. The loss of the large peak at 3500 $cm^{-1}$ is indicative of the loss of Si—OH groups on the surface of the particles in the fluorinated sample.

FIG. 3 shows an infrared spectrum of fumed $SiO_2$ particles and fluorinated fumed $SiO_2$ particles. The loss of the large peak at 3500 $cm^{-1}$ is indicative of the loss of Si—OH groups on the surface of the particles in the fluorinated sample.

Method of Forming Micronized Droplets of Diethanolamine (DEA)

In one example, fluorinated nanoparticles of $TiO_2$ (Degussa, P25, 0.1430 g) were mixed with diethanolamine (0.1051 g) using a spatula to form very small droplets of diethanolamine encapsulated by the powder. The sample was also agitated by vortexing it in a vial.

Method of Forming Micronized Droplets of Monoethanolamine (MEA)

In one example, fluorinated nanoparticles of $TiO_2$ (Degussa, P25, 0.2661 g) were mixed with monoethanolamine (0.131 g) using a spatula to create very small liquid marbles encapsulated by the nanoparticles.

In another example, fluorinated nanoparticles of $SiO_2$ were mixed with monoethanolamine and homogenized at 3000-10000 rpm to give a fluffy, free flowing composition.

Method of Forming Micronized Droplets of Neat MEA ("Dry MEA")

In one example, fluorinated fumed silica (1.5198 g) and MEA (1.5378 g) were mixed and homogenized in a Teflon cup at a shear rate of 3000-10000 rpm, yielding a fluffy, free-flowing white powder, or "dry MEA".

Method of Forming Micronized Droplets of 30% Aqueous MEA Solution

In one example, fluorinated fumed silica (1.4666 g) was placed in a Teflon cup and 30% aqueous MEA (4.2822 g) was added. The mixture was homogenized at a shear rate of 3000-10000 rpm, yielding a fluffy, free-flowing white powder.

Figure 4:
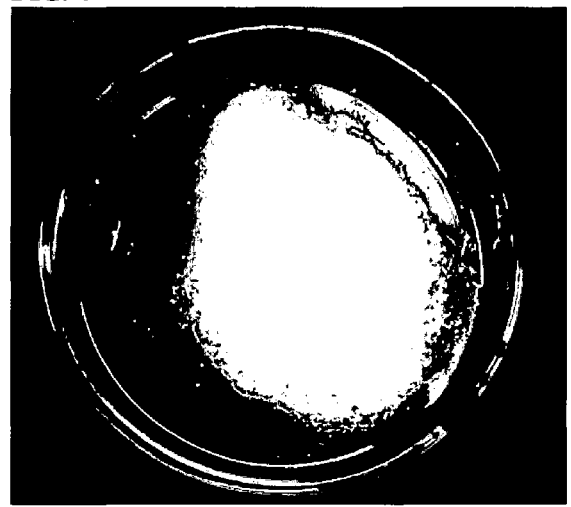
FIG. 4 shows a photograph of white-powdered $SiO_2$-based dry 30% MEA solution.

FIG. 4 shows a photograph of white-powdered $SiO_2$-based dry 30% MEA solution.

Method of Forming Micronized Droplets of Water

Using $TiO_2$ coated with fluorinated silica affords dry water when mixed with water at a high shear rate.

In one example, a homogenizer was used at a shear rate of 14000 rpm for 2 minutes with 1.08 g of treated $TiO_2$ powder and 2.7 g of water, yielding a fluffy, free-flowing white powder. This powdery material is in essence micronized liquid marbles, also referred to as "dry water" or water-in-air microemulsions.

Figure 5:
FIG. 5 shows a photograph of white-powdered $TiO_2$-based dry water.

FIG. 5 shows a photograph of white-powdered $TiO_2$-based dry water.

Figure 6A:
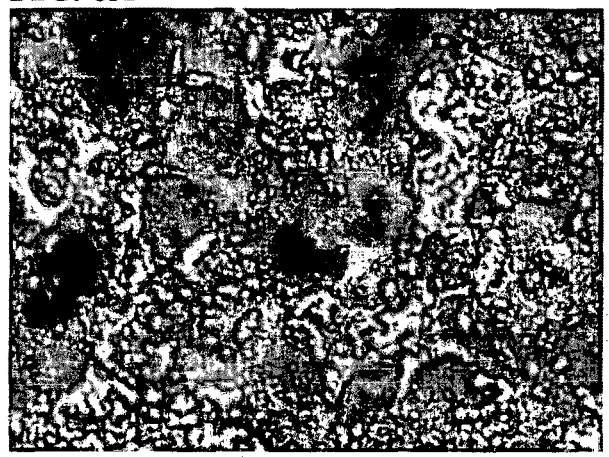
FIG. 6A shows an optical microscope image of $TiO_2$ dry water at 100× magnification after being left at room temperature for almost 5 days.

FIG. 6A shows an optical microscope image of $TiO_2$ dry water at 100× magnification after being left at room temperature for almost 5 days.

Figure 6B:
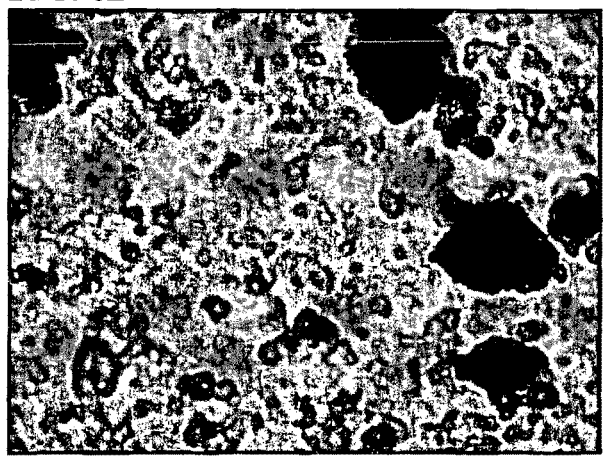
FIG. 6B shows an optical microscope image of $TiO_2/SiO_2$ starting material at 100× magnification. The globular structures in the dry water are translucent to light due to the presence of water in the micronized liquid marbles, whereas the large aggregates of the starting material appear dark and relatively opaque to light since the entire aggregate is composed of the $TiO_2/SiO_2$ particles.

FIG. 6B shows an optical microscope image of $TiO_2/SiO_2$ starting material at 100× magnification. The globular structures in the dry water are translucent to light due to the presence of water in the micronized liquid marbles, whereas the large aggregates of the starting material appear dark and relatively opaque to light since the entire aggregate is composed of the $TiO_2/SiO_2$ particles.

Method of Capturing $CO_2$

A typical small-scale laboratory gas-absorption set-up consists of flowing the gas to be absorbed through a Schlenk flask and through a bubbler. The weight change of the flask is measured to determine amount of gas absorbed.

In one example, a 25 mL Schlenk flask equipped with a Teflon screw valve (or a glass stop-cock) and a Suba-seal septum was charged with 30% aqueous MEA (2.0181 g) and flushed with $CO_2$ gas at a flow rate of ~900 mL/min. The flow rate of $CO_2$ gas was checked prior to each experiment. The flask was cooled with a water bath (room temperature) for the duration of $CO_2$ flow. After 1 minute of $CO_2$ exposure, the $CO_2$ flow was turned off and the flask weighed. The increase in weight was 74.4 mg.

Earlier measurements indicated that when the flask is purged with $CO_2$, replacing air with $CO_2$, the increase in weight is 29.5 mg (repeated twice) for this flask.

2.0181 g of 30% aqueous MEA solution: Assume that density of this solution is similar to that of water. Therefore 2.0181 cm$^3$ of headspace is taken up by MEA solution.

Density of air at 25° C.=1.18 mg/mL
Density of $CO_2$ at 25° C.=1.96 mg/mL
0.78*2.02=1.6 mg
29.5−1.6=27.9 mg (expected increase in weight due to headspace)
74.4−27.9=46.5 mg (increase in weight due to $CO_2$ absorbed by MEA)
46.5/2.0181=23.0 mg of $CO_2$ absorbed per g of 30% aqueous MEA solution after 1 minute of $CO_2$ exposure.

In another example, "dry MEA" (3.0014 g, formed as described above) was placed in a Schlenk flask equipped with a Teflon screw valve (or a glass stop-cock) and a Suba-seal septum (weight without "dry MEA": 88.1082 g). The weight of the flask with MEA was recorded and tared. $CO_2$ gas was flowed through the Schlenk tube at a rate of approximately 900 mL/min. The flask was placed in a water bath at room temperature for the duration of gas flow to minimize changes in temperature of the flask. The increase in weight was attributed to a) the chemical absorption of $CO_2$ by MEA and b) the displacement of air by $CO_2$ in the headspace of the flask. The same flask, when filled with air versus when filled with $CO_2$, shows a weight difference of 48.55 mg.

Figure 7:
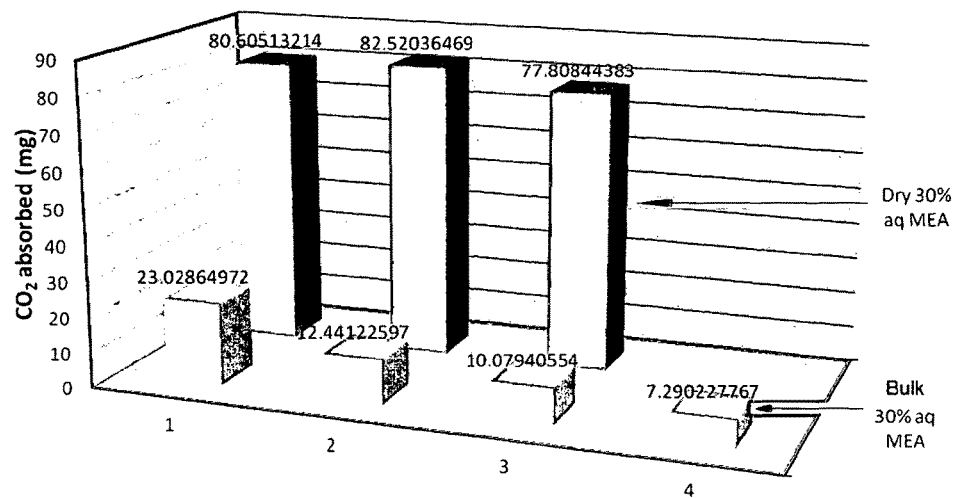
FIG. 7 shows a graph showing the different amounts of $CO_2$ absorbed by 30% aqueous MEA in the "dry" versus bulk form.

FIG. 7 shows a graph showing the different amounts of $CO_2$ absorbed by 30% aqueous MEA in the "dry" form versus bulk form.

Figure 8:
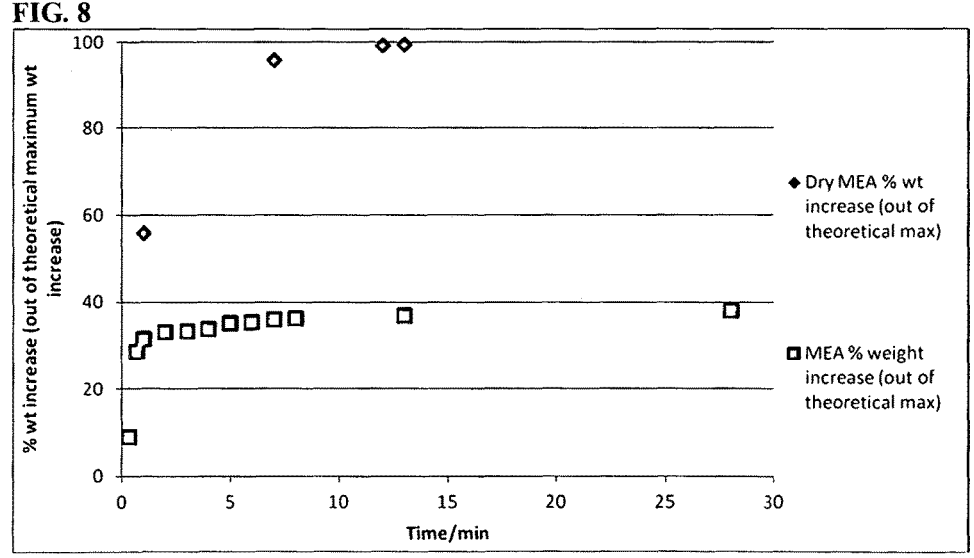
FIG. 8 shows the percentage weight increase (due to $CO_2$ absorption) against the maximum theoretical weight increase with time for this example.

Simple calculations show that the expected weight increase due to $CO_2$ in the headspace for this experiment should be approximately 47.0 mg. The theoretical maximum $CO_2$ absorbed is: 0.5330 g. FIG. 8 shows the percentage weight increase (due to $CO_2$ absorption) against the maximum theoretical weight increase with time for this example.

The same set-up is used with neat MEA (98%, Aldrich), and the weight of the sample is measured against time. However, the $CO_2$ uptake does not reach maximum capacity even after almost 30 minutes, instead, staying at about 40%. This is due to the low surface area of MEA exposed to $CO_2$.

The samples tested here are on relatively small scales. As the volume of MEA or liquid utilized increases, the gas/liquid interfacial area to liquid volume ratio usually decreases (except with agitation). Therefore, in an industrial setting, on the gallon-scale, differences between "dry MEA" and bulk MEA for $CO_2$ absorption or "dry liquids" and bulk liquid for gas purification and dehydration will be magnified significantly.

$CO_2$ Capture with Stirred MEA $CO_2$ capture with neat MEA (98%, 2.0762 g) was performed in a manner similar to that of static, unstirred MEA, with the exception of a magnetic stir bar added to the reaction mixture. The mixture was stirred at 200 rpm while exposed to $CO_2$ gas flow of 900 mL/min.

Figure 9:
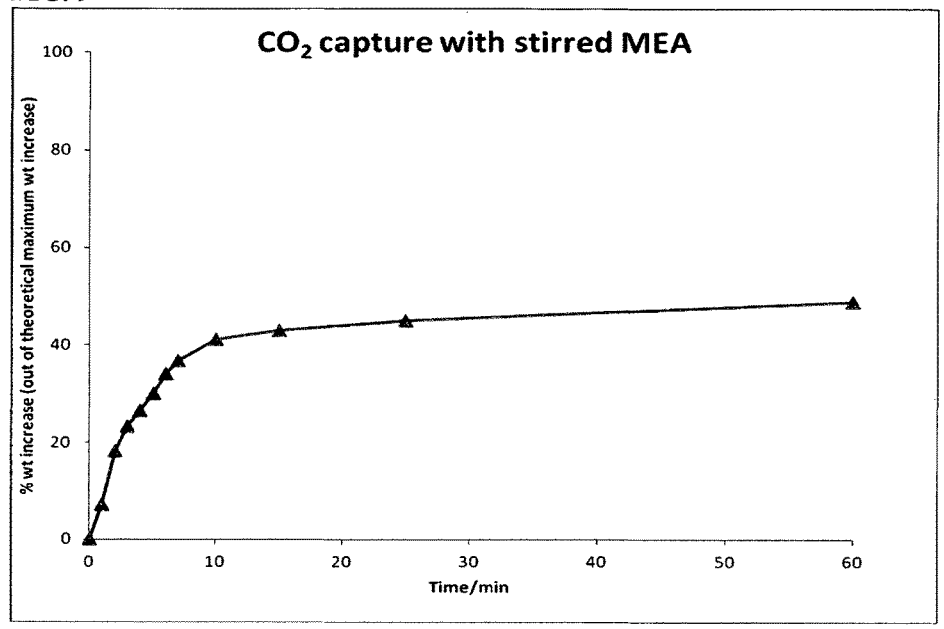
FIG. 9 shows a chart for $CO_2$ absorption with stirred MEA against time out of the theoretical maximum amount of $CO_2$ to be absorbed.

FIG. 9 shows a chart for $CO_2$ absorption with stirred MEA against time out of the theoretical maximum amount of $CO_2$ to be absorbed.

It can be seen that even with agitation of the MEA by stirring, the amount of $CO_2$ captured does not rise above 50% after 60 minutes of $CO_2$ flow.

Further, the mass of MEA used was only about 2 g, and therefore the interfacial area to volume ratio is relatively high. When the amount of MEA utilized is significantly increased, the interfacial area to volume ratio will drop drastically, leading to even lower $CO_2$ absorption rates.

$CO_2$ Capture with "Dry MEA"—Regeneration and Re-Use

Figure 10:
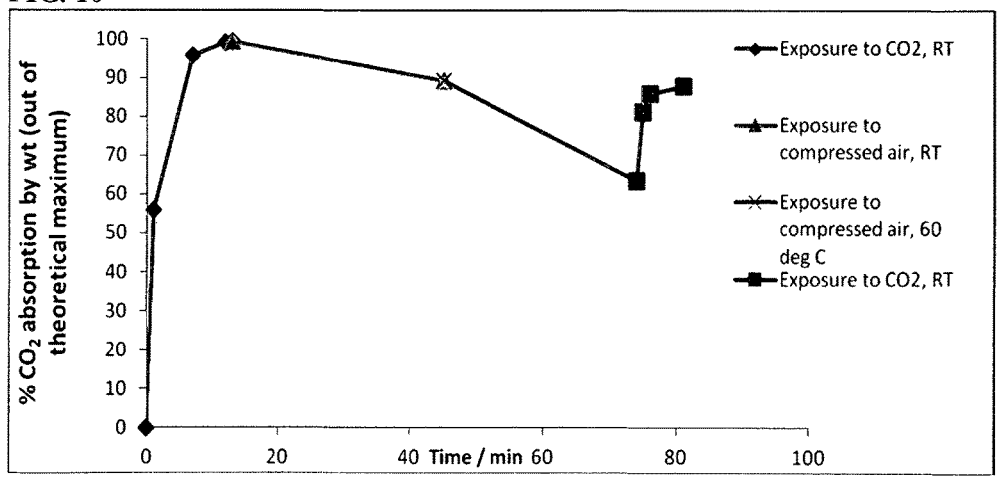
FIG. 10 shows a chart that even without applied heat, the $CO_2$ absorbed can be driven off by air flow (note that even though the different sections are shown as a continuous graph for ease of presentation and reading, they are not necessarily uninterrupted on the timescale of the experiment. However, the flask is completely sealed in between the different sections (e.g. between the first exposure to $CO_2$ and the first purge with compressed air, there may be a break of 10 minutes or so)).

FIG. 10 shows a chart that even without applied heat, the $CO_2$ absorbed can be driven off by air flow. Note that even though the different sections are shown as a continuous graph for ease of presentation and reading, they are not necessarily uninterrupted on the timescale of the experiment. However, the flask is completely sealed in between the different sections (e.g. between the first exposure to $CO_2$ and the first purge with compressed air, there may be a break of 10 minutes or so).

We initially used compressed air (which contains $CO_2$) rather than $N_2$ due to the low cost. If mild heat (60° C., temperature of oil bath) is applied together with the airflow, then the regeneration of dry MEA-carbamate is faster. For a proof-of-principle experiment, we then re-exposed the partially regenerated dry MEA to $CO_2$, and again, rapid $CO_2$ absorption is observed from the weight gain.

The "dry MEA" remained as a dry powder form, and there was no need to homogenize the silica/MEA mixture for the duration of the above experiment.

To test the re-usability of "dry MEA": The $CO_2$ absorption and regeneration of "dry MEA" was investigated and we found that not only is the absorption of $CO_2$ much faster than that of bulk MEA, but similarly, the regeneration is also faster.

Figure 11:
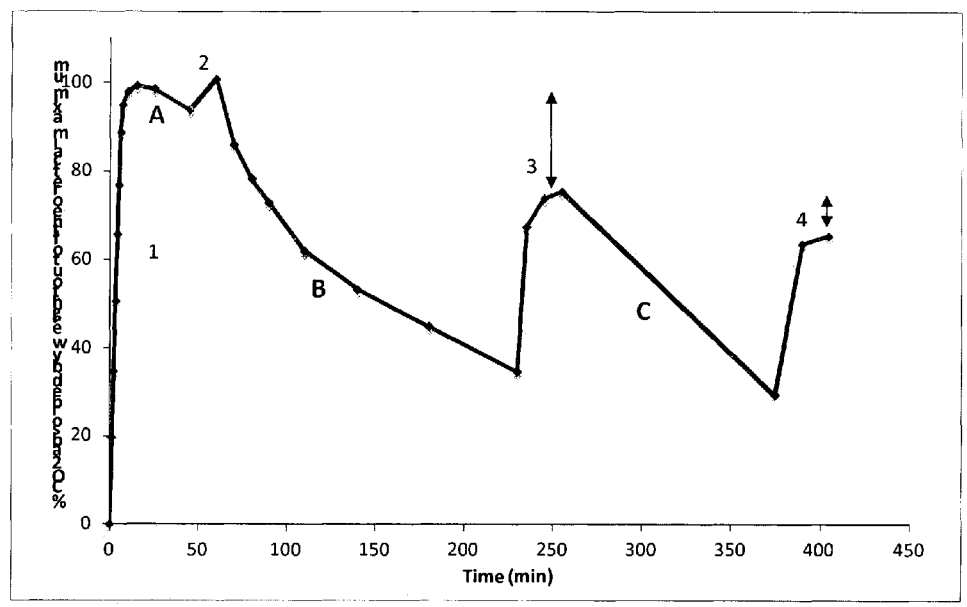
FIG. 11 shows a graph showing re-use of "dry MEA" and regeneration via different methods.
Figure 12:
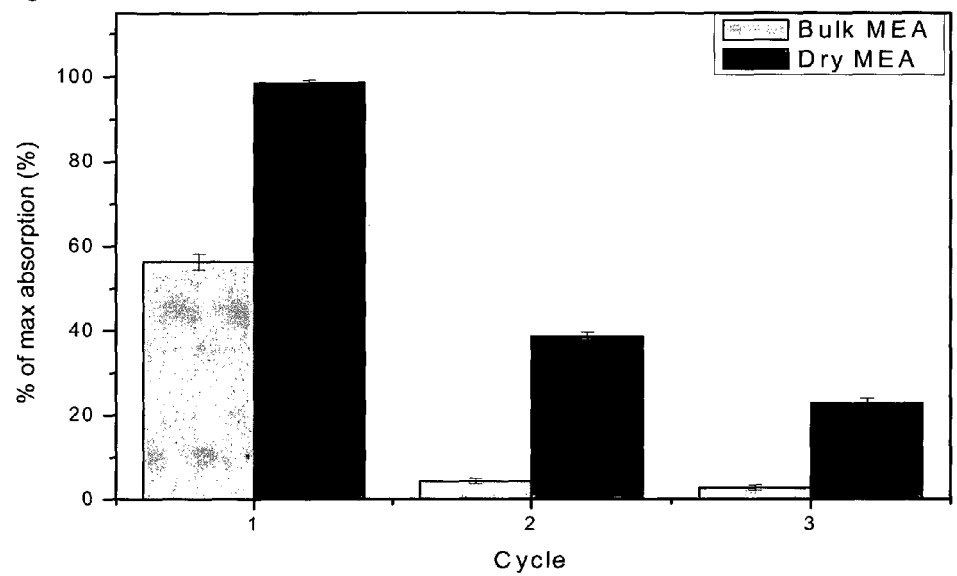
FIG. 12 shows a bar graph comparing the recyclability of bulk MEA with "dry MEA", whereby heating lasts for 1 hour for each cycle of regeneration.
Figure 13:
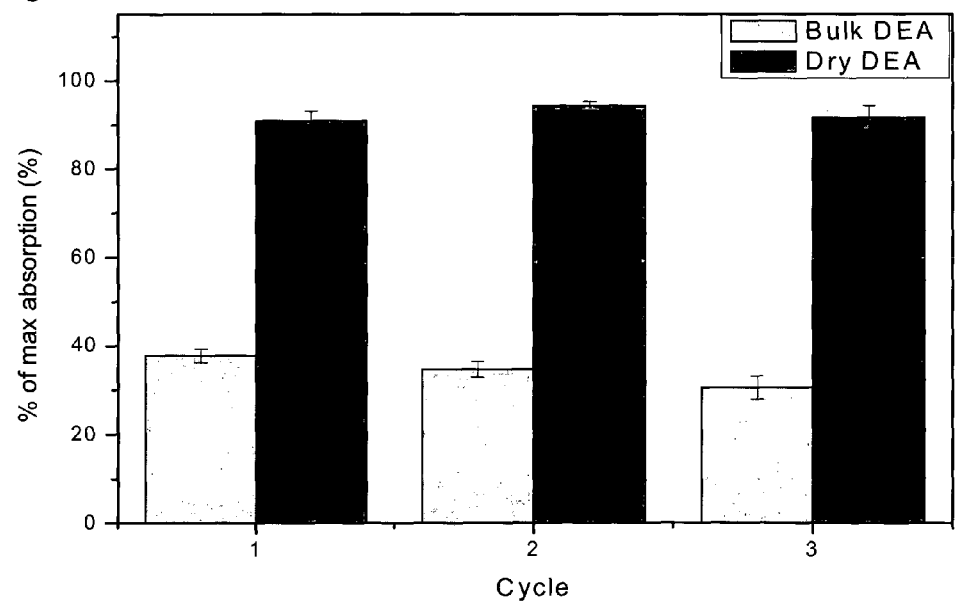
FIG. 13 shows a bar graph comparing the recyclability of bulk DEA with "dry DEA", whereby heating lasts for 1 hour for each cycle of regeneration.
Figure 14A:
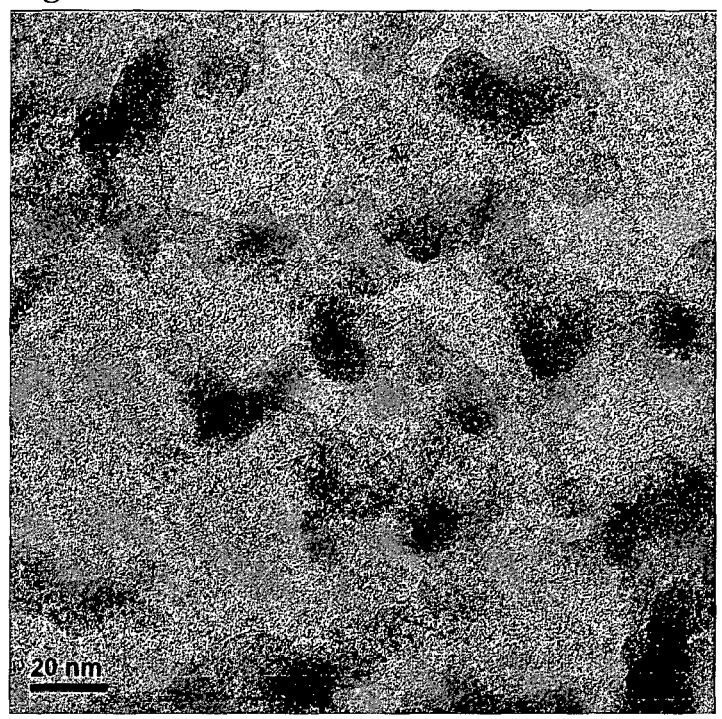
FIG. 14A shows a transmission electron microscope image of fumed $SiO_2$ particles.
Figure 14B:
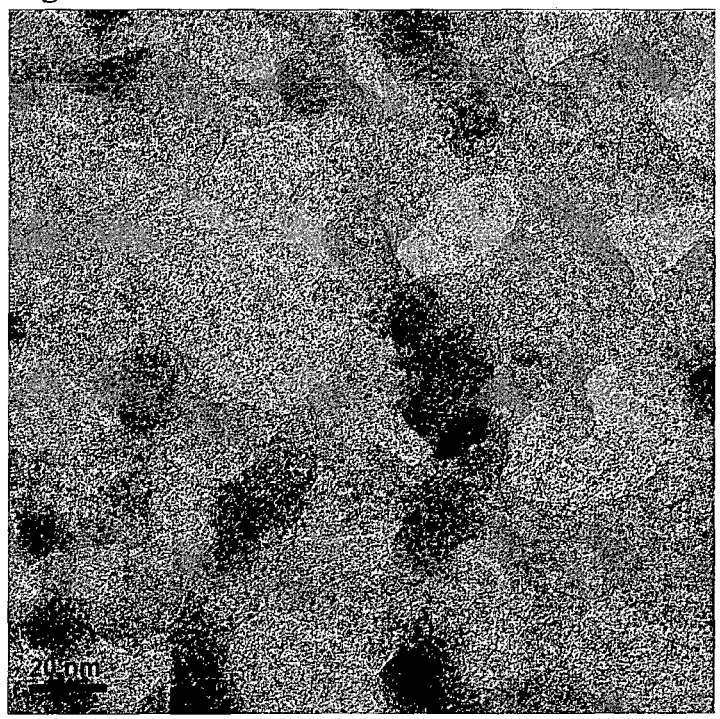
FIG. 14B shows a TEM image of fumed $SiO_2$ particles which have been treated with 1H,1H,2H,2H-perfluorooctyl-triethoxysilane.

We tested regeneration under different conditions/methods. FIG. 11 shows a graph showing re-use of "dry MEA" and regeneration via different methods.

At Point 1: The flask containing "dry MEA" was loaded with $CO_2$ (flow rate=900 mL/min) at room temperature and the $CO_2$ loading was monitored by the weight change of the flask.

At Point A: The flask containing "dry MEA" which was loaded with $CO_2$, was placed in an oven at 80° C., with the flask open to the atmosphere. No additional gas flow was supplied. We noted that the regeneration was very slow without gas flow and at 80° C. Therefore, the sample was fully charged with $CO_2$ to saturation and then regeneration B was carried out.

At Point 2: The flask containing partially regenerated "dry MEA" from A was recharged with $CO_2$ at a flow rate of 900 mL/min at room temperature for 15 minutes.

At Point B: The flask containing "dry MEA" which was loaded with $CO_2$ was placed in an oil bath at 100° C., with a flow of 500 mL/min of compressed air through the flask. The regeneration is relatively fast but the "dry MEA" is progressively oxidized. We observed a color change from a white powder to an increasingly orange powder in the "dry MEA", which is an indication of oxidative degradation of MEA. This is a general issue with MEA, common to various areas where this chemical is utilized. Also, industrially, there is typically a condenser or similar apparatus to retain the MEA solution during the regeneration process. Some MEA may have been lost as vapor during the regeneration process.

At Point 3: The flask containing partially regenerated "dry MEA" from B was recharged with $CO_2$ at a flow rate of 900 mL/min at room temperature for 25 minutes. The capacity of "dry MEA" for CO2 absorption has dropped to approximately <80%. We postulate that this is mostly because the use of compressed air is unsuitable for this purpose and oxidative degradation of MEA occurred during B.

At Point C: The flask containing "dry MEA" which was loaded with $CO_2$ was placed in an oil bath at 105° C., with a flow of 700 mL/min of Argon gas through the flask.

At Point 4: The flask containing partially regenerated "dry MEA" from C was recharged with $CO_2$ at a flow rate of 900 mL/min at room temperature for 30 minutes. We can see that the decrease in $CO_2$ absorption capacity from Point 3 to 4 is not as drastic as from Point 2 to 3.

A point worth noting is that the oxidative degradation of MEA occurs if air is used for regeneration. Therefore, inert gas is preferably used instead. This is a general problem during regeneration, especially since the MEA must be heated for regeneration. The higher surface area of "dry MEA" means that reaction with gases (be it $CO_2$ or $O_2$) is greatly accelerated. Oxidative degradation when purged with compressed air at elevated temperatures is therefore a potential problem. This problem is circumvented when an inert gas such as $N_2$ is utilized instead. In any case, with natural gas processing, air will not be used for regeneration because of explosive and highly flammable nature of natural gas.

In comparison with an example reported in literature (*Ind. Eng. Chem. Res.* 2005, 44, 1085-1089), we observed a higher regeneration of $CO_2$ under milder conditions. For example, after 50 minutes, at a bath temperature of 110° C. and $N_2$ flow rate of 2 L/min, they observed $CO_2$ regeneration of ~20%. In our case, after 50 minutes, at a bath temperature of 100° C. and compressed air flow rate of 0.5 L/min, we observed $CO_2$ regeneration of ~40%. Further, the amount of MEA present in the literature reported example is 50 wt %, unlike ours, which is neat MEA. Even when the weight of $SiO_2$ nanoparticles is taken into account, we can have a 78 wt % of MEA in our system.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. Method for purifying gas, comprising exposing the gas to be purified to at least one type of liquid marble, wherein the liquid marble is comprised of a plurality of particles and/or mixture of a plurality of particles encapsulating at least one type of liquid therein, wherein the plurality of particles comprises a material selected from the group consisting of a metal, a metal oxide, an organic compound, a polymer, a composite, and a mixture thereof, wherein the plurality of particles is grafted with hydrophobic and/or oleophobic molecules, wherein the hydrophobic molecules comprise a silane of formula $R_mSi(OR')_{4-m}$, wherein m is an integer from 1-4;

R is a C6-C18 alkyl; and

R' is a C1-C10 alkyl, or wherein the hydrophobic molecules comprise a silane of formula $RSiX_3$, $R_2SiX_2$, or $R_3SiX$, wherein R is a C1-C18 alkyl; and X is a halogen, or wherein the oleophobic molecules comprise a fluorinated or a perfluorinated silane of formula $R_mSi(OR')_{4-m}$ or $R_mSiX_{4-m}$, wherein m is an integer from 1-4;

R is a fluorinated or a perfluorinated C6-C18 alkyl;

R' is a C1-C10 alkyl; and

X is a halogen, or wherein the oleophobic molecules comprise a fluorinated or a perfluorinated fatty acid of formula RCOOH, wherein R is a fluorinated or a perfluorinated C6-C18 alkyl, or wherein the oleophobic molecules comprise a fluorinated or a perfluorinated fatty acid chloride of formula RCOCl, wherein R is a fluorinated or a perfluorinated C6-C18 alkyl.

2. Method according to claim 1, wherein the plurality of particles is comprised of titanium dioxide ($TiO_2$), zinc oxide (ZnO), aluminium oxide ($Al_7O_3$), or cerium oxide ($CeO_2$).

3. Method according to claim 1, wherein the plurality of particles comprises nanoparticles, sub-micron particles, or microparticles.

4. Method according to claim 1, wherein the gas to be purified comprises a mixture of at least two of natural gas, flue gas, carbon monoxide, carbon dioxide, hydrogen sulfide, water vapour, sulfur-containing gas, malodorous gas, and toxic gas.

5. Method according to claim 1, wherein at least one of the plurality of particles is hydrophobic, oleophobic, and/or omniphobic.

6. Method according to claim 1, wherein the at least one type of liquid is selected from the group consisting of ionic liquid, alkanolamine, molecule containing amine functionality, desiccant, glycol, a solution thereof, amine-containing oligomers or polymers and a mixture thereof.

7. Method according to claim 6, wherein the alkanolamine comprises monoethanolamine (MEA), diethanolamine (DEA), triethanolamine (TEA), methyldiethanolamine (MDEA), or 2-amino-2-methyl-1-propanol (AMP).

8. Method according to claim 7, wherein the alkanolamine comprises neat MEA or an aqueous solution of MEA.

9. Method according to claim 7, wherein the alkanolamine comprises neat DEA or an aqueous solution of DEA.

10. Method according to claim 6, wherein the at least one type of liquid comprises a mixture of at least one alkanolamine and at least one further amine.

11. Method according to claim 10, wherein the at least one alkanolamine comprises MEA, DEA, or AMP and the at least one further amine comprises piperazine.

\* \* \* \* \*